United States Patent
Perry

[19]

[11] Patent Number: 6,043,808

[45] Date of Patent: Mar. 28, 2000

[54] COMPUTER MOUSE ASSEMBLY INCLUDING A PROTECTIVE COVER

[76] Inventor: Robert C. Perry, 5755 SW. Willow La., Lake Oswego, Oreg. 97035

[21] Appl. No.: 09/134,230

[22] Filed: Aug. 14, 1998

Related U.S. Application Data

[63] Continuation-in-part of application No. 08/842,304, Apr. 23, 1997, abandoned.

[51] Int. Cl.⁷ .................................................... G09G 5/08
[52] U.S. Cl. .......................... 345/163; 345/167; 248/118
[58] Field of Search ..................................... 345/156, 163, 345/164, 165, 166, 167; 248/118, 118.1

[56] References Cited

U.S. PATENT DOCUMENTS

| | | |
|---|---|---|
| D. 361,556 | 8/1995 | Moro et al. . |
| D. 365,342 | 12/1995 | Evenson et al. . |
| D. 376,177 | 12/1996 | Springer . |
| 4,799,054 | 1/1989 | House . |
| 4,893,954 | 1/1990 | Kotur ..................................... 400/714 |
| 5,193,925 | 3/1993 | Foulke . |
| 5,203,845 | 4/1993 | Moore . |
| 5,245,146 | 9/1993 | Florence . |
| 5,488,392 | 1/1996 | Haris . |
| 5,556,061 | 9/1996 | Dickie . |
| 5,562,270 | 10/1996 | Montague ............................. 248/118.1 |
| 5,738,325 | 4/1998 | Brown . |

*Primary Examiner*—Richard A. Hjerpe
*Assistant Examiner*—Kimnhung Nguyen
*Attorney, Agent, or Firm*—Smith-Hill and Bedell

[57] ABSTRACT

A flexible membrane extends over the upper surface of a mouse pad and a mouse resting on the pad in order to keep the mouse pad clean and prevent contamination of the mouse ball with dirt and other foreign matter.

14 Claims, 2 Drawing Sheets

6,043,808

COMPUTER MOUSE ASSEMBLY INCLUDING A PROTECTIVE COVER

CROSS-REFERENCE TO RELATED APPLICATION

This application is filed as a continuation-in-part of patent application Ser. No. 08/842,304 filed Apr. 23, 1997, now abandoned.

BACKGROUND OF THE INVENTION

This invention relates to a computer mouse assembly including a protective cover.

A computer mouse is widely used as a pointing device for a personal computer, for controlling movement of a cursor over the display screen of the computer's monitor. The common form of computer mouse has a mouse body for gripping in the user's hand, the mouse body having a bottom wall which slides over a mouse pad. The bottom wall of the mouse body is formed with an opening which affords access to a cavity containing a mouse ball and a movement encoding mechanism. A retainer plate formed with a circular hole is fitted removably in the opening in the bottom wall of the mouse body. The diameter of the circular hole in the retainer plate is somewhat smaller than the diameter of the mouse ball, so the mouse ball is held captive in the cavity in the mouse body but protrudes through the hole in the retainer plate. As the user slides the mouse over the mouse pad, the mouse ball rolls against the movement encoding mechanism, which detects the rolling movement of the mouse ball and generates an electrical pulse signal in response thereto. The pulse signal is supplied to the computer's system unit and is used by the system unit to control movement of the cursor over the computer's monitor screen.

The computers that are used in schools are frequently equipped with mouses. If foreign matter is present on the mouse pad, it might be carried by the mouse ball into the cavity of the mouse body, where it is transferred to the movement encoding mechanism and there is a possibility that operation of the movement encoding mechanism will be impaired. This may lead to erratic movement of the cursor. Although efforts are made to keep school computer labs clean, the computer mouse is frequently in need of cleaning to remove dirt from the ball and from the movement encoding mechanism. Moreover, there is a continuing problem in school computer labs of students removing mouse balls, requiring that the balls be replaced or that the entire mouse be replaced.

The typical mouse pad is rectangular and is about 10 inches by about 8 inches. Nevertheless, it is commonly necessary to move the mouse less than two inches in order to displace the cursor from left to right of the monitor and by less than one inch to displace the cursor from top to bottom of the monitor. Thus, it is not normally necessary to be able to move the mouse continuously, in a single sweep, from side to side or forward and back over the whole extent of the mouse pad.

SUMMARY OF THE INVENTION

In accordance with a first aspect of the invention there is provided a computer mouse assembly comprising a mouse pad having an upper surface, a mouse resting on the upper surface of the mouse pad, a flexible membrane attached to the mouse pad and extending over the upper surface of the mouse pad and over the mouse.

In accordance with a second aspect of the invention there is provided a computer mouse assembly comprising a mouse pad having an upper surface, a mouse resting on the upper surface of the mouse pad, a flexible membrane extending over the upper surface of the mouse pad and having an outer peripheral border at which it is attached to the mouse pad and an inner cap region extending over the mouse.

In accordance with a third aspect of the invention there is provided a computer mouse assembly comprising a mouse pad having an upper surface, a mouse resting on the upper surface of the mouse pad, a flexible membrane extending over the upper surface of the mouse pad and having an outer peripheral border at which it is attached to the mouse pad and an inner band embracing the mouse in a condition of tension.

In accordance with a fourth aspect of the invention there is provided a computer mouse assembly comprising a one-piece, integral and unitary flexible member including a mouse pad portion and a shroud portion, the mouse pad portion having an upper surface and the shroud portion having a lower part attached at an inner periphery to the mouse pad portion and extending outward therefrom and an upper part extending inward from the lower part and over the lower part and the mouse pad portion, and a mouse resting on the upper surface of the mouse pad portion.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
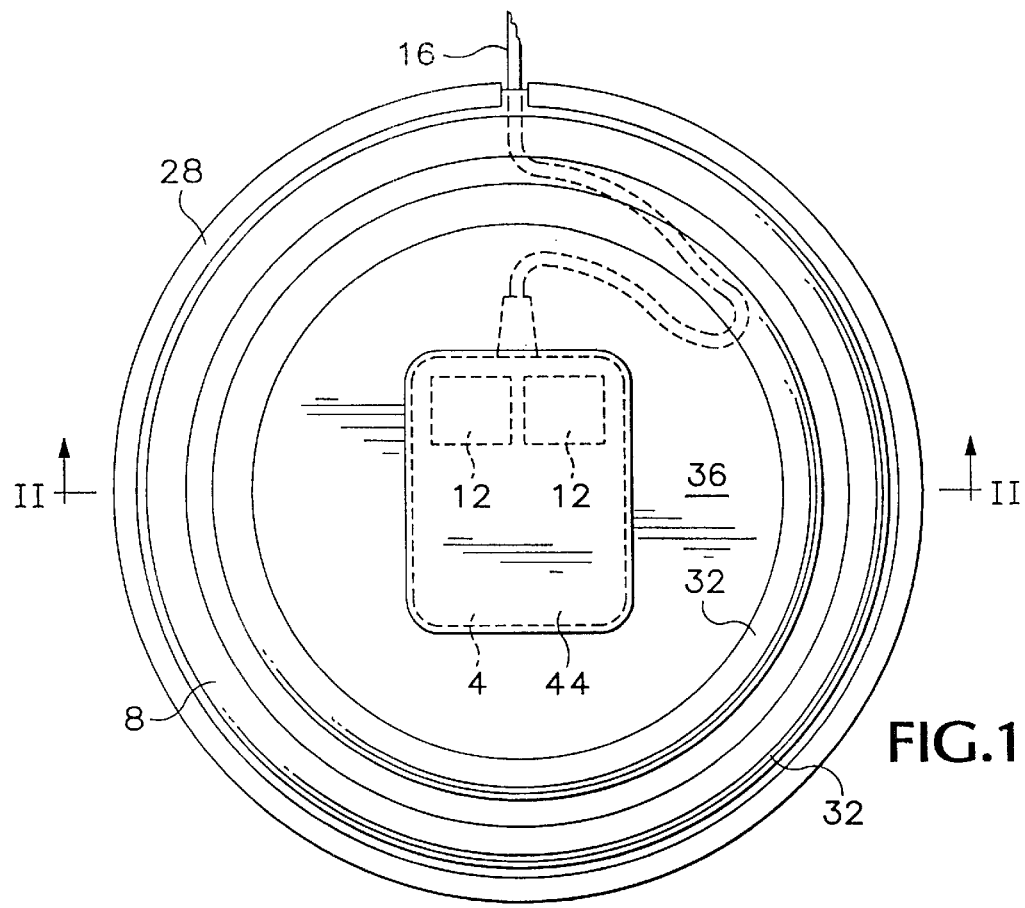
FIG. 1 is a top plan view of a first mouse assembly in accordance with the present invention.
Figure 2:
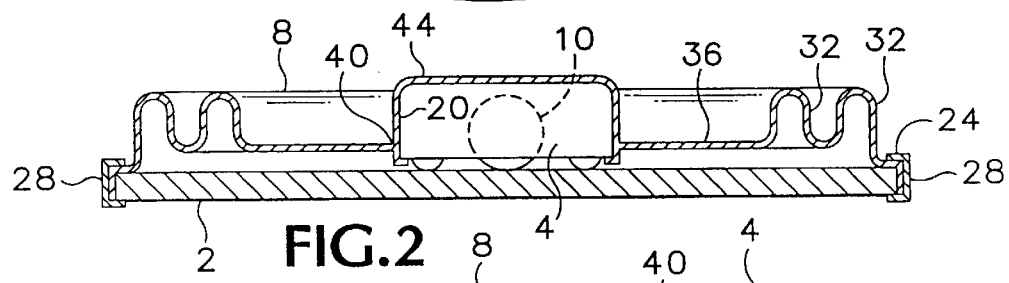
FIG. 2 is a cross-sectional view of the computer mouse assembly shown in FIG. 1.

The computer mouse assembly shown in FIGS. 1 and 2 comprises a circular mouse pad 2, a mouse 4 which rests on the mouse pad, and a flexible membrane 8 which extends over the mouse pad and the mouse.

The mouse 4 is generally conventional in form and has a mouse body with a bottom wall which slides over the mouse pad. The mouse includes a mouse ball 10 in rolling engagement with the upper surface of the mouse pad. The mouse has left and right buttons 12 in its forward region, which are actuated by pressing the buttons. A mouse cord extends from the mouse body and is connected to the computer's system unit (not shown). The mouse body has an outer peripheral wall 20 which extends generally perpendicular to the mouse pad when the mouse rests on the mouse pad.

The membrane 8 is made of flexible imperforate material, such as rubber or vinyl. The membrane is generally circular and has an outer peripheral border 24 which is in contact with the upper surface of the mouse pad around the periphery of the upper surface. A flange 26 extends vertically from the border 24. The outer peripheral margin of the membrane is held in contact with the upper surface of the mouse pad by a U-shaped spring clip 28 which grips the membrane and the mouse pad and extends around the periphery of the mouse pad.

Inward of the outer peripheral margin, the membrane is formed with two pleats 32 to form a bellows. Although two pleats are shown, it will be appreciated that the bellows may be formed with more or fewer pleats.

Inward of the bellows is a region 36 of the membrane which is thin and generally flat, and this flat region is bounded inwardly by a band 40. When the membrane is in a relaxed state, the band lies over an area of the pad which is approximately the same shape as the mouse body, when viewed in plan, but is slightly smaller. The mouse is fitted inside the band so that the band extends around the peripheral wall 20 of the mouse. The band has a lip which extends under the bottom wall of the mouse. When the band is fitted over the mouse, it is placed in tension and consequently the band grips the mouse body firmly. A strip of double-sided adhesive tape may be provided around the peripheral wall of the mouse for added security in securing the mouse to the membrane. Inward of the band 40, the material of the membrane is rather loose when the mouse is not in position. The material inward of the band extends over the top of the mouse in the manner of a cap 44 and covers the mouse buttons 12, but it is sufficiently thin that tension in the cap is insufficient to pull the band off the mouse body.

The mouse cord 16 is threaded between the outer peripheral margin 24 of the membrane and the upper surface of the mouse pad 2 between the two ends of the clip 28. There is sufficient cord between the membrane and the upper surface of the mouse pad to allow the mouse to be moved over a range of about 5 inches from left to right and about 4.5 inches toward and away.

The membrane 8 provides a continuous surface over the mouse pad 2 and keeps the mouse pad clean. Consequently, the mouse ball 10 remains clean and there is reduced danger of dirt being transferred by the mouse ball into the movement encoder mechanism, such as would impair the operation of the mouse. Further, since the mouse ball is hidden from sight, there is a reduced likelihood that the mouse ball will be removed by a person without proper authorization. Since the portion of the membrane that extends over the top of the mouse is thin and highly flexible, it does not interfere with the pressing of the mouse buttons 12. The bellows readily allows sliding movement of the mouse over the mouse pad in any direction. The bellows also allow the mouse to be lifted, e.g. in order to move it to one side without moving the cursor to enable the cursor to be moved farther to the opposite side. The user can readily grip the mouse body between thumb and little finger and lift the mouse off the mouse pad.

The mouse pad may be attached to a working surface, for example the top surface of a desk or table, by use of pieces of double-sided adhesive tape (not shown).

In a modification of the computer mouse assembly shown in FIGS. 1 and 2, the peripheral margin of the membrane is attached to the mouse pad using an adhesive material rather than a clip.

Figure 3:
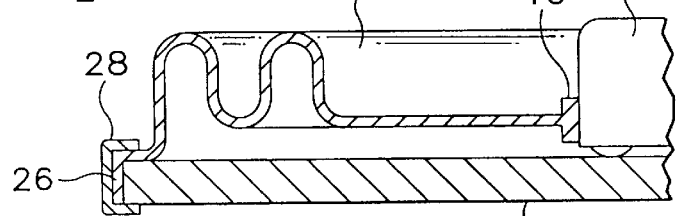
FIG. 3 is a partial sectional view of a second computer mouse assembly in accordance with the present invention.

FIG. 3 illustrates a modification of the computer mouse assembly shown in FIGS. 1 and 2. In accordance with the modification shown in FIG. 3, the band 4 surrounds an aperture in the membrane 8 and the upper surface of the mouse is exposed through the aperture. The tension in the band grips the mouse securely and prevents the membrane from becoming detached from the mouse. However, a teacher or technician can readily remove the mouse should the need arise.

Figure 4:
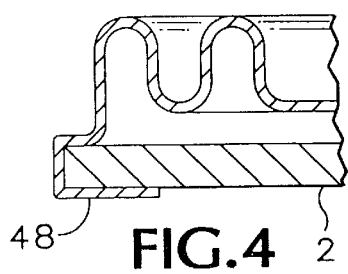
FIG. 4 is a partial sectional view illustrating a modification of the mouse assembly shown in FIGS. 1 and 2.
Figure 5:
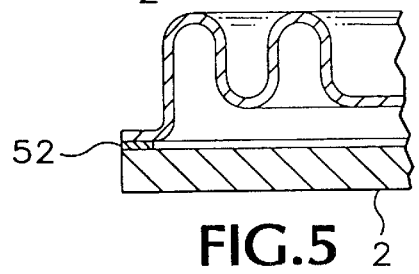
FIG. 5 is a partial sectional view illustrating a second modification of the mouse assembly shown in FIGS. 1 and 2.

FIGS. 4 and 5 illustrate alternative means for attaching the membrane to the mouse pad. FIG. 4 shows that the membrane may be molded with an internal flange 48 which extends under the mouse pad. FIG. 5 shows adhesive 52 between the outer peripheral margin of the membrane and the mouse pad.

Figure 6:
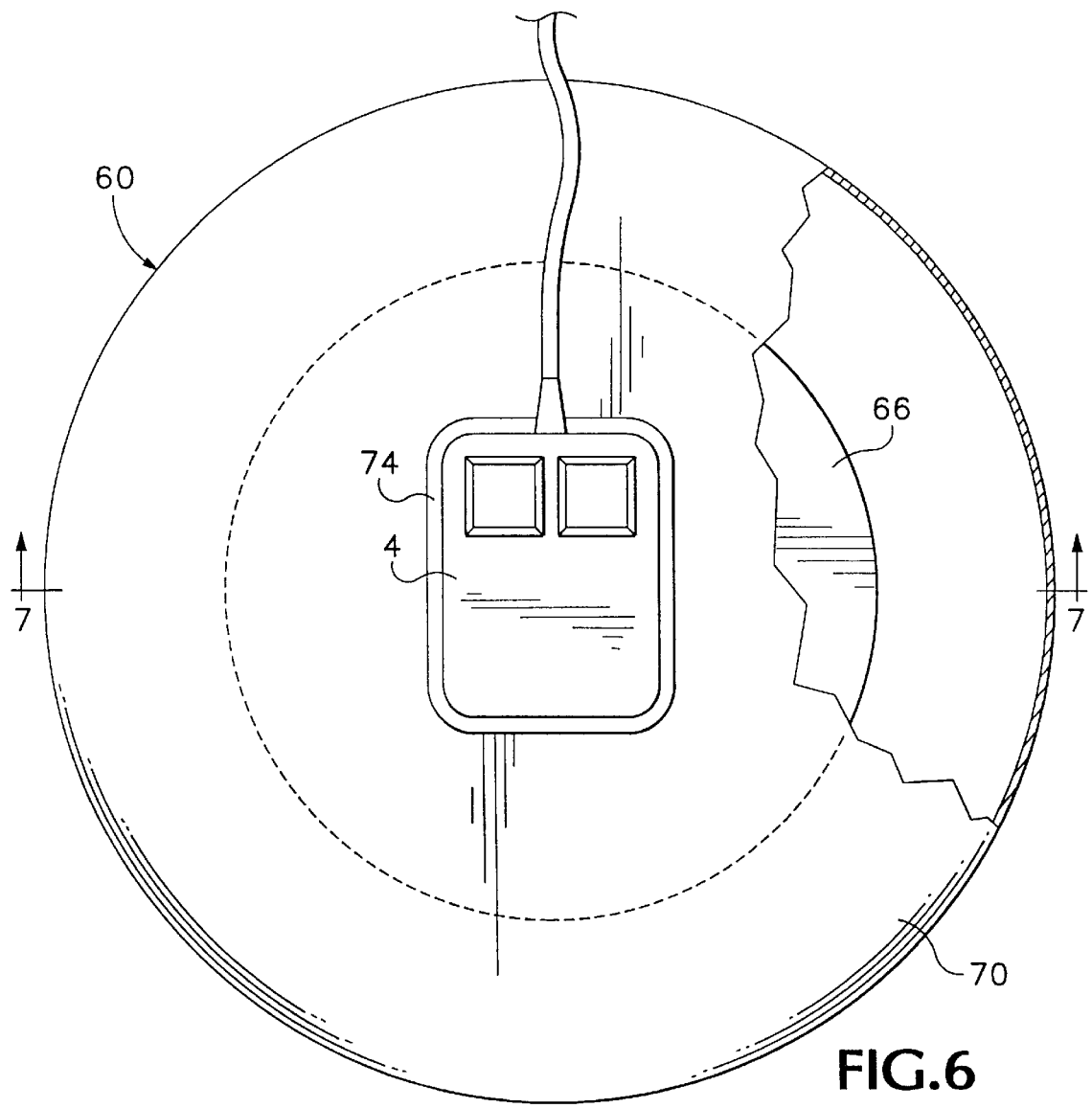
FIG. 6 is a top plan view of a third computer mouse assembly in accordance with the present invention, partially broken away.
Figure 7:
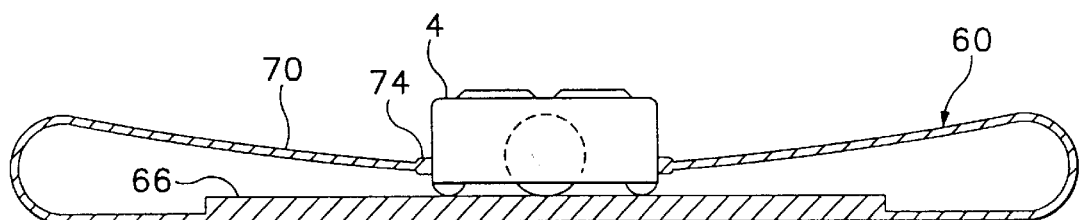
FIG. 7 is a partial sectional view of the mouse assembly shown in FIG. 6 with the mouse at the center of the mouse pad.
Figure 8:
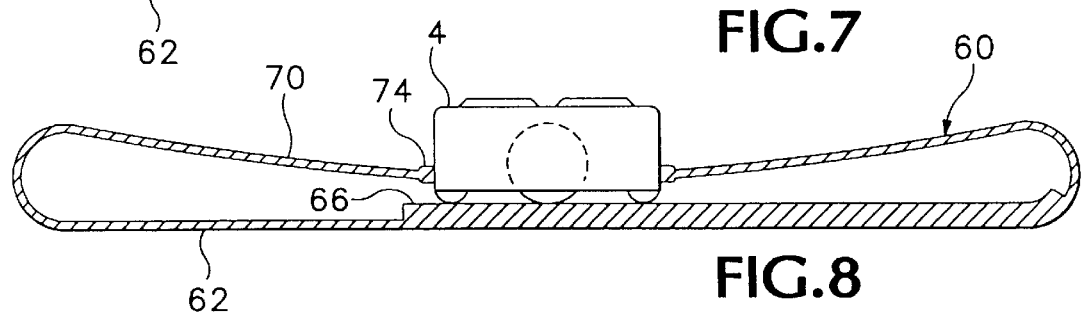
FIG. 8 is a partial sectional view of the mouse assembly shown in FIG. 6 with the mouse close to one edge of the mouse pad.

The computer mouse assembly shown in FIGS. 6–8 includes a one-piece mouse pad and shroud. The mouse pad and shroud is molded as a single unit, for example using silicone rubber or other suitable flexible material, and accordingly the mouse pad and shroud are integral or unitary with each other. The shroud 60 has a lower portion 62 extending outward from the mouse pad 66. The shroud 60 also has an upper portion 70 which extends inward from the lower portion 62, over the lower portion 62 and the mouse pad 66. The upper portion 70 of the shroud has an inner periphery which is bounded inwardly by a band 74. The mouse is fitted inside the band 70 so that the band extends around the peripheral wall of the mouse. When the band is fitted over the mouse, it is placed in tension and consequently the band grips the mouse firmly. The band 74 is positioned on the wall of the mouse below the level at which the mouse cable enters the mouse, so that the cable extends over the shroud. The band 74 may be formed with a notch or recess to receive the cable.

When the mouse 4 is centered on the mouse pad, the lower portion of the shroud rests on the table or desk with the mouse pad. When the mouse pad and shroud are in a relaxed state, without the mouse present, the band 74 lies over an area of the pad 66 which is approximately the same shape as the mouse body, when viewed in plan, but is slightly smaller. It will be seen from a comparison of FIGS. 7 and 8 that when the mouse is moved toward one edge of the mouse pad, the opposite edge of the mouse pad is lifted from the desk or table. Accordingly, the mouse pad assembly shown in FIGS. 6 and 7 does not require that the shroud be formed with bellows to accommodate a full range of motion of the mouse. The material of the mouse pad and shroud is selected so that the mouse can be displaced to the full extent of its range of movement over the mouse pad without stretching the shroud to a significant degree and thereby generating an uncomfortably large return force.

It will be appreciated that the invention is not restricted to the particular embodiment that has been described, and that variations may be made therein without departing from the scope of the invention as defined in the appended claims and equivalents thereof. For example, it is not necessary that the membrane shown in FIG. 1 should include a bellows since with suitable material the mouse can be displaced to the full extent of its range of movement over the mouse pad without generating an unacceptably large return force due to tension in the membrane. There is, of course, a tendency for the mouse to return to the center of the mouse pad, but this is not a significant disadvantage. If the mouse pad is supported on a center pedestal and the membrane is in the form of a shower cap fitted over the mouse pad and the mouse so that the opening of the shower cap surrounds the pedestal but is of an area substantially greater than the cross-sectional area of the pedestal, on gripping the mouse body and displacing it over the pad, the membrane is shifted without being stretched, and the opening is displaced relative to the pedestal in the opposite direction to the direction of displacement of the mouse.

I claim:

1. A computer mouse assembly comprising:

a mouse pad having an upper surface, a mouse resting on the upper surface of the mouse pad, a flexible membrane attached to the mouse pad and extending over the upper surface of the mouse pad and over the mouse.

2. A computer mouse assembly comprising:

a mouse pad having an upper surface, a mouse resting on the upper surface of the mouse pad, a flexible membrane extending over the upper surface of the mouse pad and having an outer peripheral border at which it is attached to the mouse pad and an inner cap region extending over the mouse.

3. An assembly according to claim 2, further comprising a clip which is U-shaped in cross-section and attaches the flexible membrane to the mouse pad around the periphery thereof.

4. An assembly according to claim 2, wherein the flexible membrane includes a band which embraces the mouse in a condition of tension.

5. An assembly according to claim 4, wherein the membrane includes a flexible bellows between said band and said outer peripheral border.

6. An assembly according to claim 2, wherein the membrane includes a flexible bellows between said inner region and said outer peripheral border.

7. An assembly according to claim 2, wherein the membrane includes an annular pleated bellows between said inner region and said outer peripheral border.

8. A computer mouse assembly comprising:

a mouse pad having an upper surface, a mouse resting on the upper surface of the mouse pad, a flexible membrane extending over the upper surface of the mouse pad and having an outer peripheral border at which it is attached to the mouse pad and an inner band embracing the mouse in a condition of tension.

9. An assembly according to claim 8, wherein the inner band defines an aperture and the mouse is exposed through said aperture.

10. An assembly according to claim 8, wherein the membrane includes a continuous cap portion inward of the band and covering the mouse.

11. An assembly according to claim 8, wherein the membrane includes an annular pleated bellows between said inner band and said outer peripheral border.

12. An assembly according to claim 8, wherein the membrane includes a flexible bellows between said inner band and said outer peripheral border.

13. A computer mouse assembly comprising:

a one-piece, integral and unitary flexible member including a mouse pad portion and a shroud portion, the mouse pad portion having an upper surface and the shroud portion having a lower part attached at an inner periphery to the mouse pad portion and extending outward therefrom and an upper part extending inward from the lower part and over the lower part and the mouse pad portion, and a mouse resting on the upper surface of the mouse pad portion.

14. An assembly according to claim 13, wherein the upper portion of the shroud includes a band which embraces the mouse in a condition of tension.

* * * * *